(12) United States Patent
Pan et al.

(10) Patent No.: US 8,456,656 B2
(45) Date of Patent: Jun. 4, 2013

(54) METHOD FOR SETTING FUNCTION OPTIONS AND MULTI FUNCTION PERIPHERAL USING THE SAME

(75) Inventors: Chen-Hua Pan, Taipei County (TW); Yu-Chun Yang, Taipei County (TW); Hsueh-Kuan Shih, Taipei County (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 350 days.

(21) Appl. No.: 12/986,183

(22) Filed: Jan. 7, 2011

(65) Prior Publication Data

US 2012/0138440 A1    Jun. 7, 2012

(30) Foreign Application Priority Data

Dec. 2, 2010    (TW) .............................. 99141950 A

(51) Int. Cl.
*G06F 3/12* (2006.01)
*H04N 1/00* (2006.01)

(52) U.S. Cl.
USPC ........... 358/1.13; 358/1.2; 358/1.9; 358/1.15; 358/1.6; 358/474; 358/505

(58) Field of Classification Search
None
See application file for complete search history.

(56) References Cited

U.S. PATENT DOCUMENTS

| 4,743,941 A * | 5/1988 | Takano ........................... 399/21 |
| 2008/0252918 A1* | 10/2008 | Nagata ........................ 358/1.13 |
| 2011/0164895 A1* | 7/2011 | Ishikake et al. ................. 399/88 |

\* cited by examiner

*Primary Examiner* — Dov Popovici
(74) *Attorney, Agent, or Firm* — Jianq Chyun IP Office

(57) ABSTRACT

A method for setting function options and a multi function peripheral (MFP) using the same are provided. The MFP at least includes an image sensor and an option switch, wherein the option switch includes a sliding groove and a shift lever, and the shift lever is disposed in sliding way in the sliding groove. The method includes using the image sensor to obtain an option image of the option switch; judging a corresponding position relating to the shift lever in the option image; and setting a peripheral function according to a function option corresponding to the corresponding position.

17 Claims, 5 Drawing Sheets

METHOD FOR SETTING FUNCTION OPTIONS AND MULTI FUNCTION PERIPHERAL USING THE SAME

CROSS-REFERENCE TO RELATED APPLICATION

This application claims the priority benefit of Taiwan application serial no. 99141950, filed on Dec. 2, 2010. The entirety of the above-mentioned patent application is hereby incorporated by reference herein and made a part of specification.

BACKGROUND OF THE INVENTION

1. Field of the Invention

The invention generally relates to a setting method, and more particularly, to a method to conduct setting on function options and a multi function peripheral using the same.

2. Description of Related Art

After being highly developed for many years, the computer peripheral products such as printer and scanner face a no-more-growth problem. In order to look for new business opportunities, the relevant manufactures increase more additional function on these products. In addition, the manufactures follow the new tendency of integrating several functions in a product, so that consumers can enjoy more functions and save more spaces under a same price level. Under the ceaseless technical sophistications, the integrating capacity of a multi function peripheral (MFP) is getting increasingly maturation and attracts public attention.

FIG. 1 is a diagram of an operation panel of a conventional MFP. Since an MFP has quite a lot functions, a conventional operation panel 110 requires more keys as shown by FIG. 1. In addition to the keys, a display screen 120, for example, a liquid crystal display module (LCD module), may be needed. However, a user needs to conduct setting layer by layer with such kind of MFP. Furthermore, due to the small size of the display screen, the user often feels quite burdensome for manipulating. In addition, an MFP in higher level requires to employ a touch panel so as to reduce the real keys, which causes the product more expensive due to the higher cost of the touch panel.

SUMMARY OF THE INVENTION

Accordingly, the invention is directed to an MFP and a method for setting function options thereof, which do not need a touch panel with high cost or real keys and the user can intuitionally manipulate.

The present invention provides a method for setting function options for an MFP. The MFP includes an image sensor and a first option switch, and the first option switch includes a first sliding groove and a first shift lever, where the said first shift lever is disposed in sliding way in the said first sliding groove. The method includes using the image sensor to obtain a first option image of the first option switch; judging a first corresponding position relating to the first shift lever in the first option image; and setting a first peripheral function according to a function option corresponding to the first corresponding position.

In an embodiment of the invention, the MFP further includes a second option switch, and the second option switch includes a second sliding groove and a second shift lever, where the said second shift lever is disposed in sliding way in the said second sliding groove. In this case, the method further includes using the image sensor to obtain a second option image of the second option switch; judging a second corresponding position relating to the second shift lever in the second option image; and setting a second peripheral function according to a function option corresponding to the second corresponding position.

On the other hand, the present invention also provides an MFP, which includes a moving flat table, an option panel, a glass plate, an image sensor and a controller. The option panel is disposed over the moving flat table, and the option panel includes a first option switch. The first option switch includes a first sliding groove and a first shift lever, where the first shift lever is disposed in sliding way in the first sliding groove. The glass plate is disposed over the moving flat table and located at a side of the option panel, wherein the option panel and the glass plate respectively define a first scan region and a second scan region. The image sensor is disposed at the moving flat table and located under the option panel and the glass plate, wherein the moving flat table brings the image sensor moving between the first scan region and the second scan region. The controller is connected to the image sensor, and used for receiving a first option image of the first scan region obtained by the image sensor, judging a first corresponding position relating to the first shift lever in the first option image and setting a first peripheral function according to a function option corresponding to the first corresponding position.

In an embodiment of the invention, the option panel further includes a second option switch including a second sliding groove and a second shift lever, where the second shift lever is disposed in sliding way in the second sliding groove. In this case, the controller further receives a second option image of the first scan region obtained by the image sensor, judges a second corresponding position relating to the second shift lever in the second option image and sets a second peripheral function according to a function option corresponding to the second corresponding position.

In an embodiment of the above invention, the controller further controls the image sensor for scanning at the second scan region according to the first peripheral function or the second peripheral function.

In an embodiment of the above invention, the first option switch or the second option switch has a set of peripheral options, a user shifts the first shift lever or the second shift lever to select one option of the set of peripheral options, and the set of peripheral options includes at least one of the following options: scanning, photocopying, faxing and printing.

In an embodiment of the above invention, the first option switch or the second option switch has an option set of paper sizes.

In an embodiment of the above invention, the first option switch or the second option switch has an option set of resolutions.

In an embodiment of the above invention, the first option switch or the second option switch has an option set of zooms.

In an embodiment of the above invention, the first option switch or the second option switch has an option set of paper single side/double sides.

In an embodiment of the above invention, the first option switch or the second option switch has an option set of display color modes.

Based on the depiction above, the present invention mainly uses a sensing method to obtain the setting values/parameters of the function options. In this way, the present invention not only reduces the employed real keys, but also does not need the touch panel with high cost so that the user is able to intuitionally manipulate.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
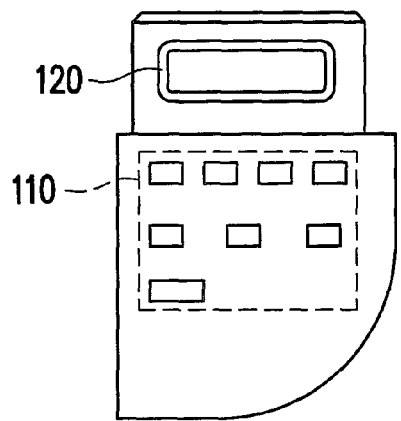
FIG. 1 is a diagram of an operation panel of a conventional MFP.

Reference will now be made in detail to the preferred embodiments of the invention, examples of which are illustrated in the accompanying drawings. Wherever possible, the same reference numbers are used in the drawings and the description to refer to the same or like parts.

Figure 2:
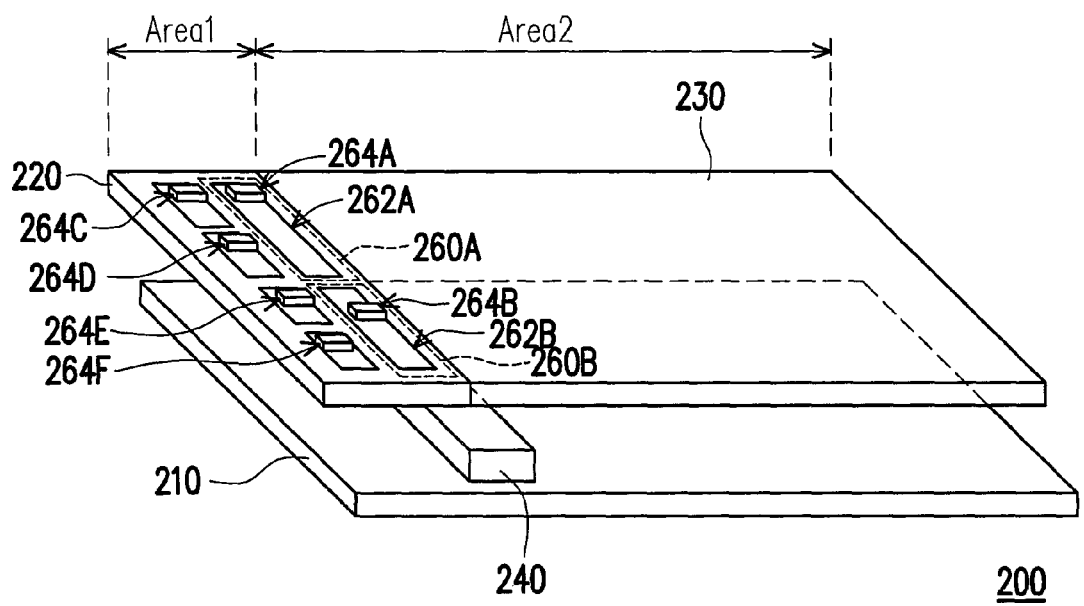
FIG. 2 is a structure diagram of an MFP according to an embodiment of the invention.
Figure 3:
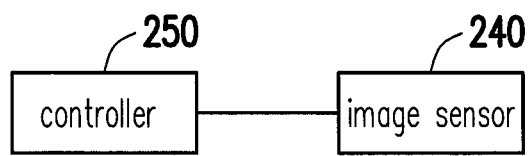
FIG. 3 is a circuit block diagram of an MFP according to an embodiment of the invention.
Figure 4:
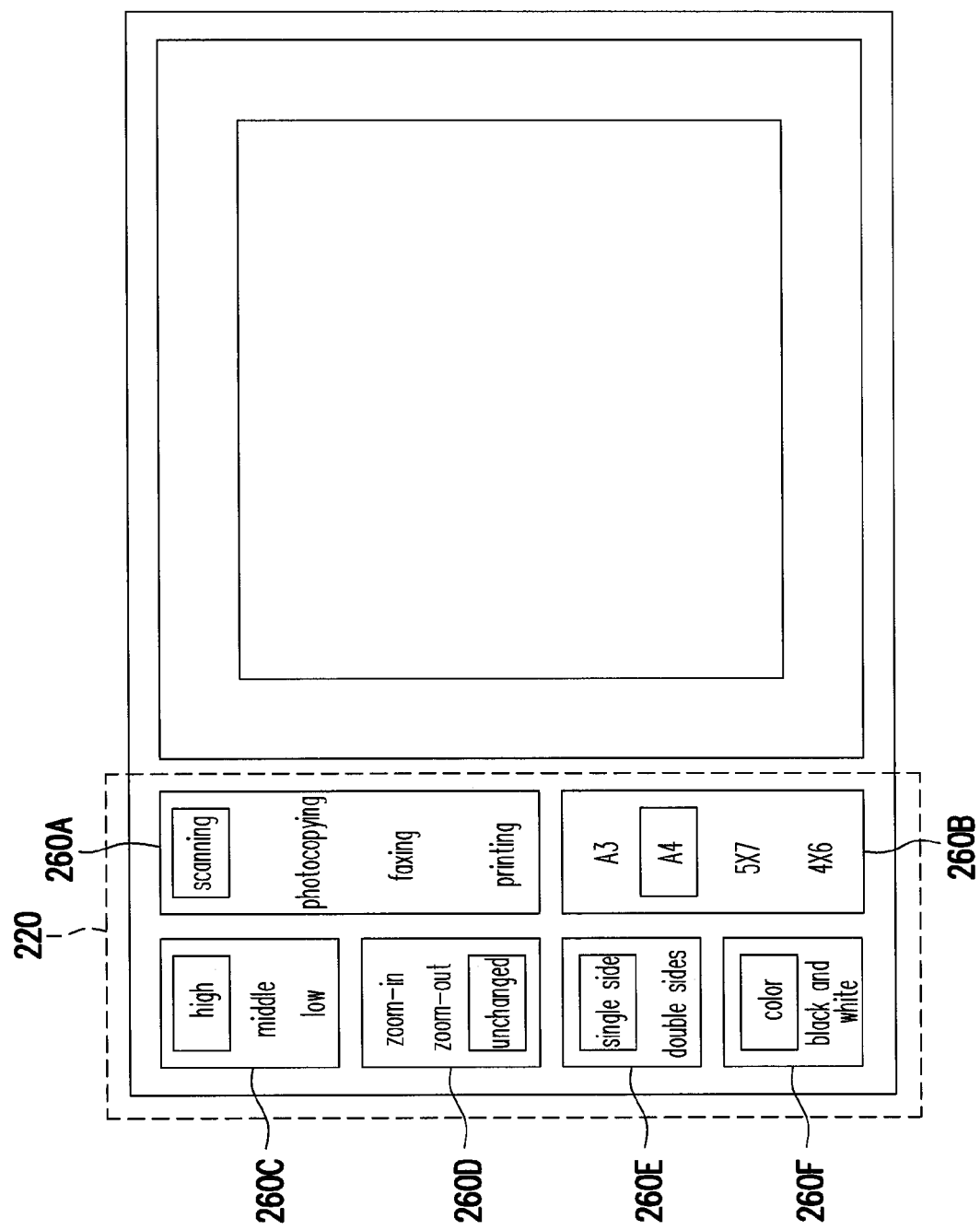
FIG. 4 is a top-view diagram of an MFP according to an embodiment of the invention.
Figure 5:
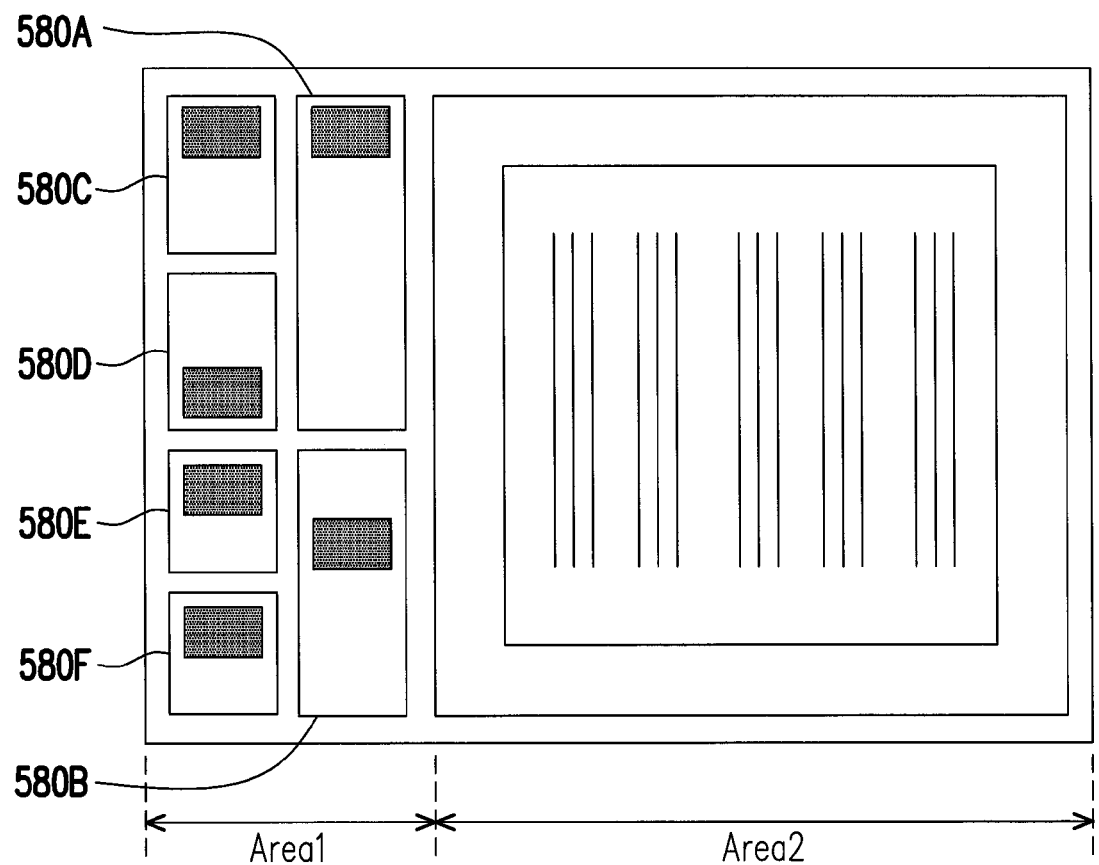
FIG. 5 is an image diagram of the options of FIG. 4.

FIG. 2 is a structure diagram of an MFP according to an embodiment of the invention, FIG. 3 is a circuit block diagram of an MFP according to an embodiment of the invention, FIG. 4 is a top-view diagram of an MFP according to an embodiment of the invention and FIG. 5 is an image diagram of the options of FIG. 4.

Referring to FIGS. 2-5, in the embodiment, the MFP 200 may include a moving flat table 210, an option panel 220, a glass plate 230, an image sensor 240 and a controller 250.

The option panel 220 may be disposed over the moving flat table 210, and the option panel 220 may include an option switch 260A. The option switch 260A includes a sliding groove 262A and a shift lever 264A, wherein the shift lever 264A may be disposed in sliding way in the sliding groove 262A. The glass plate 230 may be disposed over the moving flat table 210 and located at a side of the option panel 220, wherein the option panel 220 and the glass plate 230 respectively define a first scan region Area1 and a second scan region Area2.

The image sensor 240 is disposed at the moving flat table 210 and located under the option panel 220 and the glass plate 230, wherein the moving flat table 210 brings the image sensor 240 moving between the first scan region Area1 and the second scan region Area2.

The controller 250 is connected to the image sensor 240, so that the controller 250 may receive an option image 580A of the first scan region Area1 obtained by the image sensor 240, judge a first corresponding position relating to the shift lever 264A in the option image 580A, and set a first peripheral function according to a function option corresponding to the first corresponding position.

In another embodiment of the present invention, the option panel 220 may include an option switch 260A and an option switch 260B. Similarly, the option switch 260A includes a sliding groove 262A and a shift lever 264A, and the option switch 260B includes a sliding groove 262B and a shift lever 264B, wherein the shift lever 264A may be disposed in sliding way in the sliding groove 262A and the shift lever 264B may be disposed in sliding way in the sliding groove 262B. The controller 250 may receive an option image 580A and an option image 580B of the first scan region Area1 both obtained by the image sensor 240, judge a first corresponding position relating to the shift lever 264A in the option image 580A and judge a second corresponding position relating to the shift lever 264B in the option image 580B, and set a first peripheral function and a second peripheral function according to the function options respectively corresponding to the first corresponding position and the second corresponding position.

Furthermore, in another embodiment of the present invention, the option panel 220 may have a plurality of option switches 260A-260F. In the scan image of FIG. 5, there are a plurality of option images 580A-580F, which are respectively corresponding to the option switches 260A-260F. Each black block area in FIG. 5 is the corresponding position of the shift lever in each the option image. By means of the black block area, the corresponding position of the shift lever in each the option image can be judged. After that, each function of the MFP can be set according to the corresponding function option of the judged position. In this way, the embodiment can achieve the similar effect to the above-mentioned embodiment.

In more details, the option switch 260A has a set of peripheral options. The peripheral options may include options of scanning, photocopying, faxing and printing. In the peripheral options of the embodiment, the shift lever 264A is shifted by the user to 'scanning' option. In addition, when the peripheral option is set to 'scanning' or 'photocopying', the controller 250 may further control the image sensor 240 to perform scanning at the second scan region Area2.

For yet another example, the option switch 260B has an option set of paper sizes. For example, the option set of paper sizes may include A3-size paper, A4-size paper, 5"×7"-size paper and 4"×6"-size paper. In the options of paper sizes of the embodiment, the shift lever 264B is shifted by the user to the option of 'A4-size paper'.

For yet another example, the option switch 260C has an option set of resolutions. For example, the option set of resolutions may include high level resolution, middle level resolution and low level resolution. In the options of resolutions of the embodiment, the shift lever 264C is shifted by the user to the option of 'high level resolution'.

For yet another example, the option switch 260D has an option set of zooms. For example, the option set of zooms may include zoom-in, unchanged and zoom-out. In the options of zooms of the embodiment, the shift lever 264D is shifted by the user to the option of 'unchanged'.

For yet another example, the option switch 260E has an option set of paper single side/double sides. For example, the option set of paper single side/double sides may include single-side paper and double-sides paper. In the options of paper single side/double sides of the embodiment, the shift lever 264E is shifted by the user to the option of 'single-side paper'.

For yet another example, the option switch 260F has an option set of display color modes. For example, the option set of display color modes may include color display quality and black/white display quality. In the options of display color modes of the embodiment, the shift lever 264F is shifted by the user to the option of 'color display quality'.

The option switches 260A-260F shown in FIG. 4 are several selected embodiments only, which the invention is not limited thereto.

It should be noted that any one of the option switches 260A-260F may have no electrical connection point, i.e., the option switches may have no turning on or turning off function as a general circuit, wherein the option switches are only for setting the function options. In more details, the material of any one of the option switches 260A-260F may be plastic.

In addition, the image sensor 240 may be CMOS image sensor (CIS) or charge coupled device (CCD).

Figure 6:
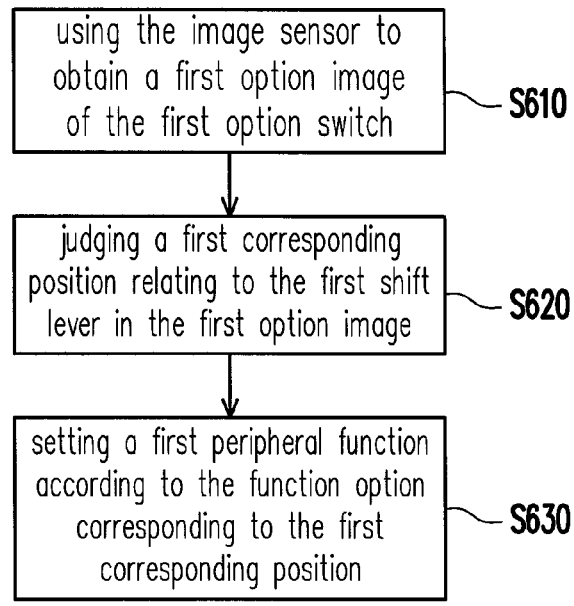
FIG. 6 is a flow chart of the method for setting function options of an MFP according to an embodiment of the invention.

Based on the content instructed by the above-mentioned embodiments, a flow chart of the method for setting function options of an MFP according to an embodiment of the invention is given by FIG. 6. Referring to FIG. 6, a first option switch includes a first sliding groove and a first shift lever and the first shift lever is disposed in sliding way in the first sliding groove. The method for setting the function options of the MFP of the embodiment includes following steps:

Using the image sensor to obtain a first option image of the first option switch (step S610);

Judging a first corresponding position relating to the first shift lever in the first option image (step S620); and Setting a first peripheral function according to a function option corresponding to the first corresponding position (step S630).

The above-mentioned step S610 to step S630 are a selected embodiment. In fact, the steps can be expanded to the function setting for a plurality of option switches. More embodiments are described in following so as to allow anyone skilled in the art to further understand the spirit of the invention and to implement the invention.

Figure 7:
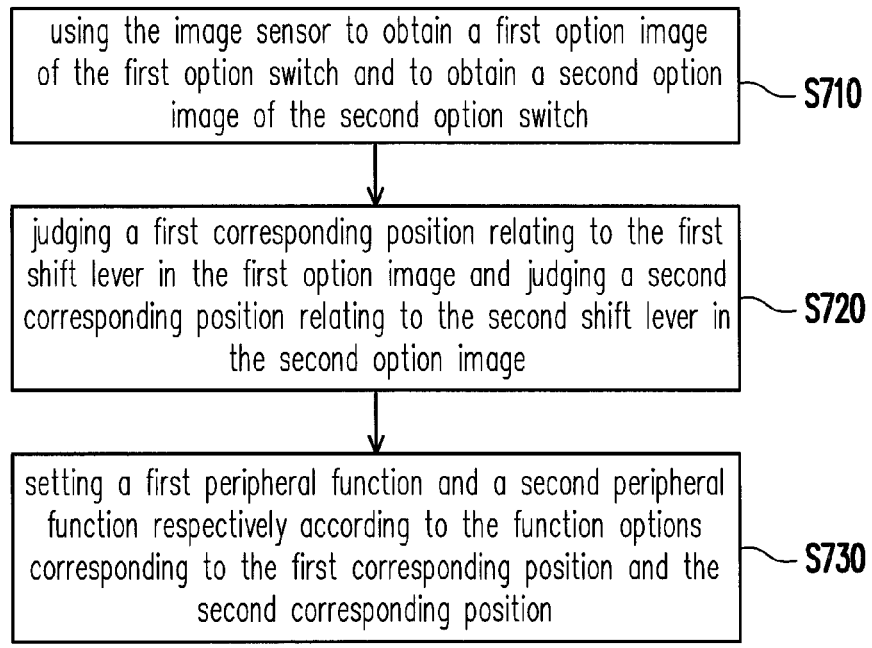
FIG. 7 is a flow chart of the method for setting function options of an MFP according to another embodiment of the invention.

Based on the content instructed by the above-mentioned embodiments, a flow chart of the method for setting function options of an MFP according to another embodiment of the invention is given by FIG. 7. Referring to FIG. 7, a first option switch includes a first sliding groove and a first shift lever, where the first shift lever is disposed in sliding way in the first sliding groove; and a second option switch includes a second sliding groove and a second shift lever, where the second shift lever is disposed in sliding way in the second sliding groove The method for setting the function options of the MFP of the embodiment includes following steps:

Using the image sensor to obtain a first option image of the first option switch and to obtain a second option image of the second option switch (step S710);

Judging a first corresponding position relating to the first shift lever in the first option image and judging a second corresponding position relating to the second shift lever in the second option image (step S720); and Setting a first peripheral function and a second peripheral function respectively according to the function options corresponding to the first corresponding position and the second corresponding position (step S730).

In yet another embodiment, referring to FIGS. 2, 4, 5 and 7, there are a plurality of option images 580A-580F in the scan image of FIG. 5, and the option images 580A-580F are respectively corresponding to the option switches 260A-260F. Each of the black block areas in FIG. 5 is corresponding to the position of the shift lever in each the option image, so that step S720 can accordingly judge the corresponding position of the shift lever in each the option image. After that in step S730, each function of the MFP can be set according to the corresponding function option of the judged position. In this way, the embodiment can achieve the similar effect to the above-mentioned embodiments.

For example, the user shifts the shift levers 264A-264F, wherein each shift lever is respectively disposed in sliding way at a position with different function options. The option switch 260A has a set of peripheral options, wherein the peripheral options may include scanning, photocopying, faxing and printing. The option switch 260B has an option set of paper sizes, wherein the option set of paper sizes may include A3-size paper, A4-size paper, 5"×7"-size paper and 4"×6"-size paper. The option switch 260C has an option set of resolutions, wherein the option set of resolutions may include high level resolution, middle level resolution and low level resolution. The option switch 260D has an option set of zooms, wherein the option set of zooms may include zoom-in, unchanged and zoom-out. The option switch 260E has an option set of paper single side/double sides, wherein the option may include, for example, single-side paper and double-sides paper. The option switch 260F has an option set of display color modes, wherein the option set of display color modes may include color display quality and black/white display quality.

The shift lever 264A is shifted by the user to the option of 'scanning'; the shift lever 264B is shifted by the user to the option of the 'A4-size paper'; the shift lever 264C is shifted by the user to the option of 'high level resolution'; the shift lever 264D is shifted by the user to the option of 'unchanged'; the shift lever 264E is shifted by the user to the option of 'single-side paper'; and the shift lever 264F is shifted by the user to the option of 'color display quality'.

In step S710, the image sensor 240 obtains the option images 580A-580F of the option switches 260A-260F. Then in step S720, the corresponding positions respectively relating to the shift levers 264A-264F in the option images 580A-580F are judged. Finally in step S730, the functions of the MFP are set according to the function options respectively corresponding to the corresponding positions. At the time, the functions of the MFP are set to 'scanning', 'A4-size paper', 'high level resolution', 'unchanged', 'single-side paper' and 'color display quality'.

The method for setting the function options is only a selected embodiment, which the invention is not limited thereto.

It should be noted that although the above-mentioned embodiments have described a feasible configuration about the method for setting the function options and the MFP using the same, but anyone skilled in the art should know each manufacture has different design of the MFP function options. Hence, the application of the invention is not limited to the described feasible configuration. In other words, once an image sensor is used to obtain the option images of the option switches and the corresponding positions relating to the shift levers in the option images are judged and the peripheral functions are set according to the functions corresponding to the corresponding positions, the scheme has fallen in the scope or the spirit of the invention already.

In summary, the invention mainly uses an image sensor to obtain the setting values of the function options in sensing method. In this way, the invention not only reduces the employed real keys, but also does not need the touch panel with high cost so that the user is able to intuitionally manipulate.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A method for setting function options of a multi function peripheral, the multi function peripheral comprising an image sensor and a first option switch, the first option switch comprising a first sliding groove and a first shift lever, the first shift lever being disposed in sliding way in the first sliding groove, and the method comprising:
   using the image sensor to obtain a first option image of the first option switch;
   judging a first corresponding position relating to the first shift lever in the first option image; and
   setting a first peripheral function according to a function option corresponding to the first corresponding position.

2. The method as claimed in claim 1, wherein the multi function peripheral further comprises a second option switch, the second option switch comprises a second sliding groove and a second shift lever, the second shift lever is disposed in sliding way in the second sliding groove, and the method further comprises:
   using the image sensor to obtain a second option image of the second option switch;
   judging a second corresponding position relating to the second shift lever in the second option image; and
   setting a second peripheral function according to a function option corresponding to the second corresponding position.

3. The method as claimed in claim 2, wherein the first option switch or the second option switch has a set of peripheral options, a user shifts the first shift lever or the second shift lever for selecting one option of the set of peripheral options, and the set of peripheral options comprises at least one of the following options: scanning, photocopying, faxing and printing.

4. The method as claimed in claim 2, wherein the first option switch or the second option switch has an option set of paper sizes.

5. The method as claimed in claim 2, wherein the first option switch or the second option switch has an option set of resolutions.

6. The method as claimed in claim 2, wherein the first option switch or the second option switch has an option set of zooms.

7. The method as claimed in claim 2, wherein the first option switch or the second option switch has an option set of paper single side/double sides.

8. The method as claimed in claim 2, wherein the first option switch or the second option switch has an option set of display color modes.

9. A multi function peripheral, comprising:
   a moving flat table;
   an option panel, disposed over the moving flat table, wherein the option panel comprises a first option switch, the first option switch comprises a first sliding groove and a first shift lever and the first shift lever is disposed in sliding way in the first sliding groove;
   a glass plate, disposed over the moving flat table and located at a side of the option panel, wherein the option panel and the glass plate respectively define a first scan region and a second scan region;
   an image sensor, disposed at the moving flat table and located under the option panel and the glass plate, wherein the moving flat table brings the image sensor moving between the first scan region and the second scan region; and
   a controller, connected to the image sensor, receiving a first option image of the first scan region obtained by the image sensor, judging a first corresponding position relating to the first shift lever in the first option image and setting a first peripheral function according to a function option corresponding to the first corresponding position.

10. The multi function peripheral as claimed in claim 9, wherein the option panel further comprises:
    a second option switch, comprising a second sliding groove and a second shift lever and the second shift lever is disposed in sliding way in the second sliding groove;
    wherein the controller receives a second option image of the first scan region obtained by the image sensor, judges a second corresponding position relating to the second shift lever in the second option image and sets a second peripheral function according to a function option corresponding to the second corresponding position.

11. The multi function peripheral as claimed in claim 10, wherein the controller further controls the image sensor for scanning at the second scan region according to the first peripheral function or the second peripheral function.

12. The multi function peripheral as claimed in claim 10, wherein the first option switch or the second option switch has a set of peripheral options, a user shifts the first shift lever or the second shift lever to select one option of the set of peripheral options, and the set of peripheral options comprises at least one of the following options: scanning, photocopying, faxing and printing.

13. The multi function peripheral as claimed in claim 10, wherein the first option switch or the second option switch has an option set of paper sizes.

14. The multi function peripheral as claimed in claim 10, wherein the first option switch or the second option switch has an option set of resolutions.

15. The multi function peripheral as claimed in claim 10, wherein the first option switch or the second option switch has an option set of zooms.

16. The multi function peripheral as claimed in claim 10, wherein the first option switch or the second option switch has an option set of paper single side/double sides.

17. The multi function peripheral as claimed in claim 10, wherein the first option switch or the second option switch has an option set of display color modes.

* * * * *